(12) United States Patent
Beato et al.

(10) Patent No.: US 7,920,296 B2
(45) Date of Patent: Apr. 5, 2011

(54) AUTOMATIC DETERMINING IMAGE AND NON-IMAGE SIDES OF SCANNED HARDCOPY MEDIA

(75) Inventors: Louis J. Beato, Rochester, NY (US);
William J. Lloyd, Rochester, NY (US);
Dale F. McIntyre, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 662 days.

(21) Appl. No.: 11/956,452

(22) Filed: Dec. 14, 2007

(65) Prior Publication Data
US 2009/0153925 A1    Jun. 18, 2009

(51) Int. Cl.
*H04N 1/40* (2006.01)
(52) U.S. Cl. .................. 358/3.28; 358/474; 358/408
(58) Field of Classification Search .............. 358/1.9, 358/2.1, 3.26, 3.28, 468, 408, 505–506, 474, 358/486–487, 496–498; 399/374
See application file for complete search history.

(56) References Cited

U.S. PATENT DOCUMENTS 7,064,863 B2 *  6/2006  Fukuda et al. ............. 358/1.9

OTHER PUBLICATIONS

IBM Technical Disclosure Bulletin, Jun. 1991, "Optical Document Scanner Apparatus for Alternatively Single-Side Scanning of Full-Size Documents or Two-Sided Scanning of Half-Size Documents."*

* cited by examiner

*Primary Examiner* — Thomas D Lee
*Assistant Examiner* — Stephen M Brinich
(74) *Attorney, Agent, or Firm* — Thomas J. Strouse; Raymond L. Owens

(57) ABSTRACT

A system and method for determining the image and ancillary image sides of scanned hardcopy media. Hardcopy prints typically provide ancillary data to supply additional information for an area of interest and can enhance the analysis of key data in the print. Postcards, for example, provide a unique form of ancillary data. On the back of a postcard image, ancillary data information such as stamps, user notes, dates, addresses, and other types of annotation can be found. This data typically provides additional information to a reader of the postcard. Dual sided scanners provide both the image and ancillary (i.e., non-image) scans simultaneously. In addition, ancillary data can be in a variety of formats, such as audio, video and the like. When a hardcopy print is scanned the scanner provides two image files that represent the image and ancillary image sides of the print. However, given two image files that represent a hardcopy print scan, the front and back need to be automatically identified as to which is of primary interest to a user.

17 Claims, 5 Drawing Sheets

Normalized Compression Ratio = (Media Height * Media Width) / JPEG Compressed File Size

FIG. 5

AUTOMATIC DETERMINING IMAGE AND NON-IMAGE SIDES OF SCANNED HARDCOPY MEDIA

FIELD OF THE INVENTION

The present invention relates to hardcopy media, and more particularly, to a method and system for determining image and ancillary image sides of scanned hardcopy prints.

BACKGROUND OF THE INVENTION

Hardcopy prints typically provide ancillary data to supply additional information for an area of interest and can enhance the analysis of key data in the print. Postcards, for example, provide a unique form of ancillary data. On the back of a postcard image, ancillary data information such as stamps, user notes, dates, addresses, and other types of annotation can be found. This data typically provides additional information to a reader of the postcard. The ancillary data can be in a variety of formats, such as audio, video and the like.

Dual sided scanners can be used to simultaneously scan the image and non-image sides of the hardcopy print. When both sides of a hardcopy print are scanned, the scanner provides two image files that represent the image and non-image or ancillary sides of the hardcopy print. Nevertheless, given two image files that represent the scanned hardcopy print, the front and back sides need to be automatically identified. Once the front and back images of the hardcopy print have been identified, the back image (i.e., ancillary image) can then be highly compressed and used for applications such as embedding the back image as ancillary data into the front image. This can be accomplished using standard JPEG compression.

Embedding this compressed ancillary data into a JPEG file offers many practical uses. For example, still images or pictures may be transmitted over the Internet with an accompanying audio file. The audio file can be a person's voice describing the picture. This allows families to share pictures including a family member's voice.

Scanned prints provide a unique type of image and ancillary data. A scanned print contains both an image and non-image side. Typically when prints are scanned, only the image side is scanned and saved as a digital file. However, many times the non-image side contains information that can be valuable to the viewing experience. The non-image side can contain manufacturer marks in the form a watermark that can be used to identify the year(s) the photo was printed. This date information can be meaningful in the creation of multimedia presentations, scrapbooks, photobooks, etc. Older prints may contain consumer marks in the form of handwritten notes, names of people in the photo, the location of the photo, or other relevant facts. Often the photofinisher places a stamp or mark on the non-image side of the print to identify the date the photo was processed and printed.

Today, automatic two-sided feeder copier systems are available. A separate sensor in the system is used to detect the presence of markings on the backside of the paper. If markings are present, it is required that the paper to be flipped and rescanned. This two-step process is time consuming and requires a reversing paper handling mechanism that is unnecessary in a double array scanner. Other systems also provide sensors that look for marks on the backside of the document and will initiate a second pass scan only if needed. However, these types of systems are not useful as post processing is necessary to determine which side of the document is of primary interest to a user.

SUMMARY OF THE INVENTION

In general terms, the present invention is a system and method for automatically identifying the image and ancillary image sides of a double-sided scan of a hardcopy print.

One aspect of the present invention includes a method for determining a primary side of a double-sided hardcopy media. More particularly, the method includes scanning a first side of a hardcopy media to produce a first file, scanning a second side of the hardcopy media to produce a second file, and analyzing the first and second files of the scanned hardcopy media for determining the side of primary interest.

Another aspect of the present invention includes a system for determining a primary side of a double-sided hardcopy media. More particularly, the system includes a scanner for digitizing a first side of a hardcopy media to produce a first file and digitizing a second side of the hardcopy media to produce a second file, and a processor for analyzing the first and second files of the scanned hardcopy media for determining the side of primary interest.

BRIEF DESCRIPTION OF THE DRAWINGS

FIG. 5 illustrates an equation for calculating the Normalized Compression Ratio used in sorting the image and ancillary image sides of the scanned hardcopy media.

DETAILED DESCRIPTION OF THE INVENTION

Figure 1:
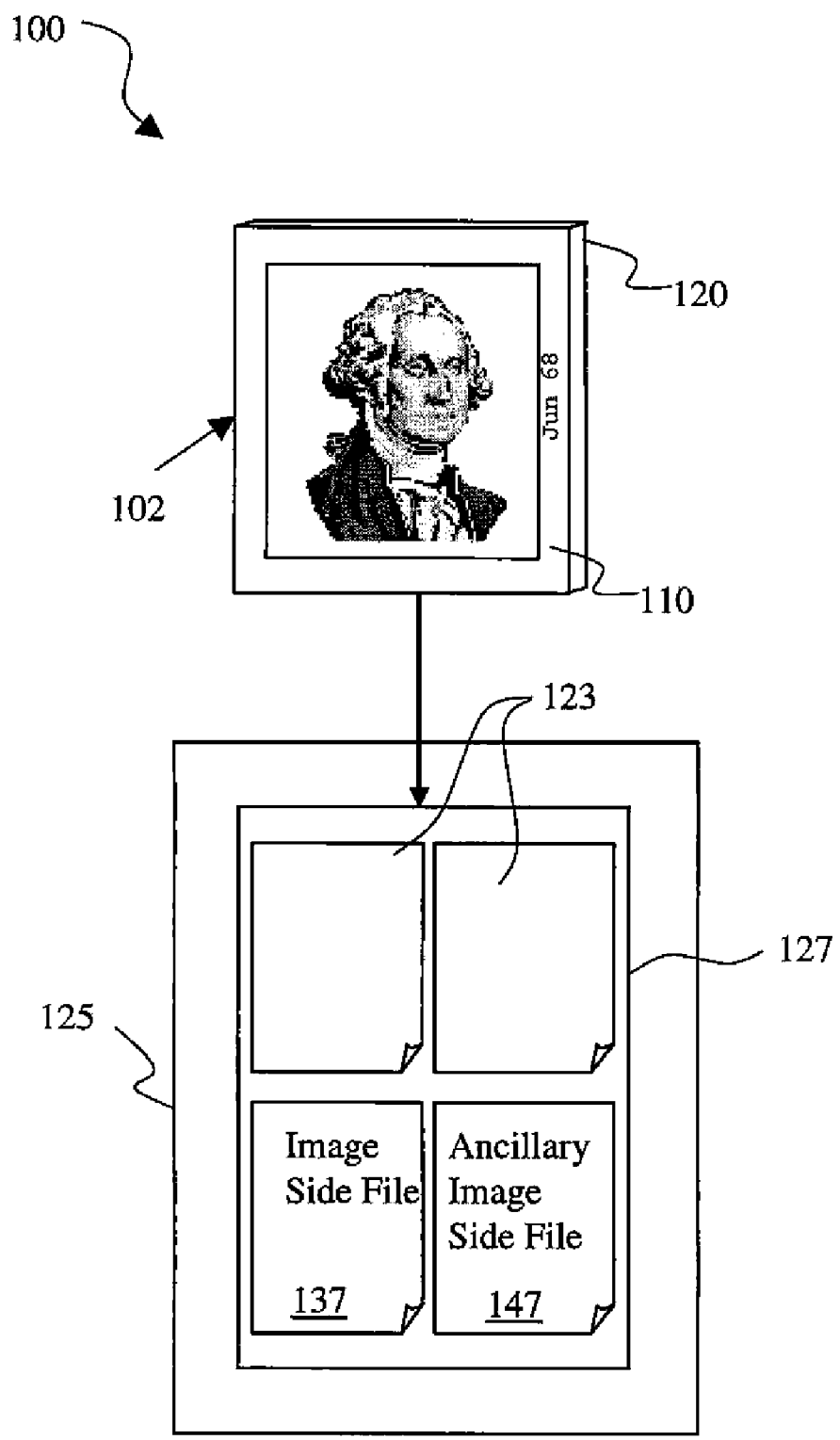
FIG. 1 illustrates a system for creating separate image files from a scanned hardcopy media.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

FIG. 1 illustrates a system 100 for determining an image side and an ancillary image side (i.e., non-image side) of a scanned hardcopy print. In FIG. 1, a hardcopy print 102 is illustrated as having an image side 110 and ancillary image side 120. The image side 110 and ancillary image side 120 are processed by a computing device 125 to produce associated JPEG files 123. The associated JPEG files are stored in a memory 127. The computing device 125 automatically analyzes the associated JPEG files 123 stored in the memory 127 and identifies and marks the associated JPEG files 123 as being associated with either the image side 110 or the ancillary image side 120 of the hardcopy print 102. As discussed hereafter, the front of the photographic print (i.e., image side) is a photographic image and the back of the photographic print (i.e., ancillary image side) contains either nothing, or manufacturer marks (i.e., watermarks), photofinisher marks (i.e., time, date stamp), or consumer marks (consumer annotations as to the place image was taken, date image was taken, or who is in the image). However, the invention is not limited to photographic prints and any similar media construction can be used, such as postcards, stamps, graphic prints or the like.

In one embodiment, a user will determine which side of the hardcopy print is a side of primary interest. For example, if the user determines that the side of primary interest is the image side of the photographic print, the system 100 will accept a plurality of unorganized photographic prints having some of the image sides facing up and some facing down. This plurality of prints will be scanned to generate image side files 137 and corresponding ancillary image side files 147 and the plurality of files is then organized so substantially all of the image sides are facing up. The resulting organized plurality of files can be displayed on a display device.

Figure 2:
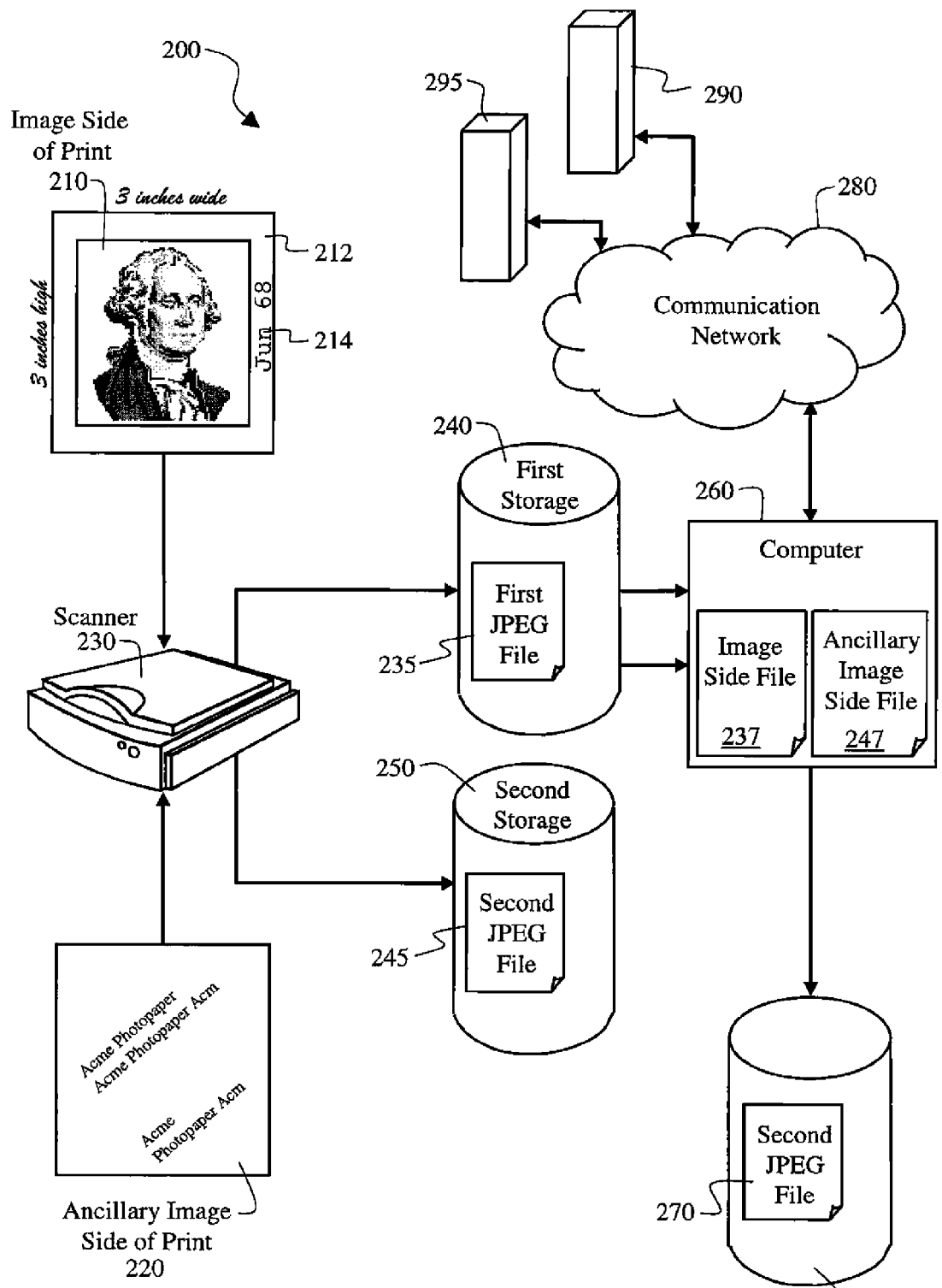
FIG. 2 illustrates another embodiment of the system for determining an image side and an ancillary image side of a scanned hardcopy print from associated JPEG files.

FIG. 2 illustrates another embodiment of the system 200 for determining an image side and an ancillary image side (i.e., non-image) of a scanned hardcopy print from associated JPEG files. In FIG. 2, the scanned hardcopy print 102 is shown having an image side 210 and ancillary image side 220. The content of the image side 210 and ancillary image side 220 are compared by scanning the first and second sides 210, 220 to produce a first JPEG file 235 stored in a first storage 240, and a second JPEG file 245 stored in a second storage 250, respectively. The system 200 then automatically determines the image side 210 and the ancillary image side 220 of the scanned print from the individual JPEG files 235, 245.

In one embodiment, the identification of the image side 210 from the ancillary image side 220 of the hardcopy print is accomplished by determining the compression ratio of the first JPEG file 235 with respect to the second JPEG file 245. That is, the digitized ancillary side of a print is typically very uniform except for the previously mentioned markings. This allows the digitized ancillary side of the print to be highly compressible resulting in a very small JPEG file. Accordingly, the relationship of the compressibility of the first JPEG file 235 of the print versus the compressibility of the second JPEG file 245 of the print can be used to identify the image side file 237 and the ancillary image side file 247 as will be discussed in more detail in FIG. 5. Accordingly, the image side 210 and ancillary image side 220 of the print can be identified.

In another embodiment, the system 200 can automatically handle images that are stacked in a feeder without regard to image orientation. Accordingly, the prints do not have to be sorted such that all the image sides are face up. This eliminates any rework necessary to rescan prints that are in the wrong orientation. It is important to maintain compatibility with the JPEG standard so that commonly available third party software can be used as needed without any modifications. JPEG is a file format standard used for compressing, storing, and transmitting digital image data. As used herein, the term "JPEG" refers to all versions, revisions, and releases of the format, including "JPEG" and "JPEG 2000." The Joint Photographic Experts Group (JPEG) developed the format and it is currently the most popular and widely used image format. One of JPEG's advantages is that it provides the greatest compression of any bitmap format in common use, allowing devices and users to store image files using the least amount of storage space. This compression capability is also one of the features that have made JPEG the most commonly used format for sending pictures over the Internet. Users can transmit and receive images in JPEG more quickly and with a higher degree of image quality than in many other formats.

In addition to data for the subject image, JPEG allows ancillary data to be stored within a JPEG file. The ancillary data can include data for applications other than an application that uses image data. For example, data that indicates the setting of the camera that captured the image or the identity of the artist who created the image can be inserted into a JPEG file. In this way, one of the advantages of the JPEG format is that data other than the subject image data can be stored and transmitted in the JPEG file itself. One important feature of storing ancillary data within a JPEG file is that only one file is used. This eliminates the need for maintaining multiple files. In FIG. 2, once the system 200 has automatically identified which side of the hardcopy print is the ancillary image side 220, that image can be marked as the ancillary image side file 247 having ancillary data and inserted into the JPEG file designated as the image side file 237.

As illustrated in FIG. 2, the system 200 includes a computer 260 that is programmed to detect the image side 210 and ancillary image side 220 of the hardcopy print. This is accomplished by the computer 260 reading the first JPEG file 235 from the first storage 240 and the second JPEG file 245 from the second storage 250. The computer 260 uses various characteristics of the two files 235, 245 to determine the image side file 237 from the ancillary image side file 247. After the computer has made the determination, the computer can then recompress the ancillary image side file 247 using a higher compression ratio than the image side file 237. As mentioned above, this is because the ancillary image side file 247 typically has a uniform background that can be highly compressed to produce ancillary data. This ancillary data will be in the form of a JPEG file and can be embedded into the image side file 237 to form a single JPEG file 270.

One embodiment of producing the image side file 237 and the ancillary image side file 247 using various scanners is discussed below. If the scanner 230 is equipped with dual cameras, the image side 210 of the print and ancillary image side 220 of the print can be scanned in one pass. However, if the scanner 230 is a simple flatbed scanner, the scanning of the image side 210 and ancillary image side 220 is accomplished in two steps.

The determination of the image side file 237 and an ancillary image side file 247 of a scanned hardcopy print from associated JPEG files will now be discussed in greater detail. The image side 210 of the print is scanned and saved into, for example, a first storage 240, and the ancillary image (or non-image) side 220 of the print is saved into, for example, a second storage 250. However, the invention is not limited to using a first and second storage 240, 250, and any suitable storage can be used, e.g., a single memory location and/or removable memory. The computer 260 calculates a probability using the first JPEG file 235 and the second JPEG file 245 to determine which file 235, 245 actually correlates to the image side 210 of the hardcopy print and will become the image side file 237. The computer 260 also calculates the probability that the determined ancillary image side file 247 is actually the ancillary image side 220 of the hardcopy print. Once the image side file 237 and ancillary side file 247 have been classified, the computer 260 combines the image side file 237 and ancillary image side file 247 into a combined file 270 that contains both the image side file 237 and ancillary image side file 247. However, the embodiment is not limited to the image side 210 being a print, and the image side 210 print could be a slide having a slide mount 212. The slide mount 212 can also have visible and/or invisible data 214 disposed on the front and/or back of the slide mount 212. The data 214 is human and/or machine-readable.

In FIG. 2, computer 260 is further connected to a communication network 280 for the purpose of storing in memory 275 and semantically indexing the combined image files 270. More specifically, computer 260 can store other sources of digital media files including digital still image files and digital video files. The process of semantically indexing a digital media file will be understood to include by way of example, but not limitation, multiple image classifiers such as material classifiers (i.e. wood, metal, glass, water, rock, grass, sand etc.) and scene classifiers (beach, gray sky, blue sky, sunset, etc.). Further, examples of semantic indexing include the detection and recognition of various scene components such as people and objects. Still other indexers include text recognition, voice recognition and voice-to-text recognition.

Semantic indexing in system 200 is accomplished by an indexing server 290 executing software that accepts a digital media file and applies various indexing technologies to create a set of indexed data for each digital media file supplied. Such indexed data can be derived from the image side 210 of the print, the ancillary image side 220 of the print, surrounding slide mount data that has the logo, date, and writing on it, or from any digital media file stored on computer 260. An advertisement server 295 is coupled to the network 280 and operates on the set of indexed data created by indexing server 290. Advertisement server 295 stores a plurality of advertisements that can be combined with the image side file 237 that was semantically indexed to create a new combined image file. The new combined image file contains advertisement data and is stored as the ancillary data in the EXIF header of the image side file 237. Advertisement data can be any type of file useful in presenting advertising information correlated to the indexed digital image file. The proper advertisement data is chosen by the advertisement server 295 to closely match the indexed information derived from the image side 210 of print or the image content of the image side file 237 provided by computer 260.

Figure 3:
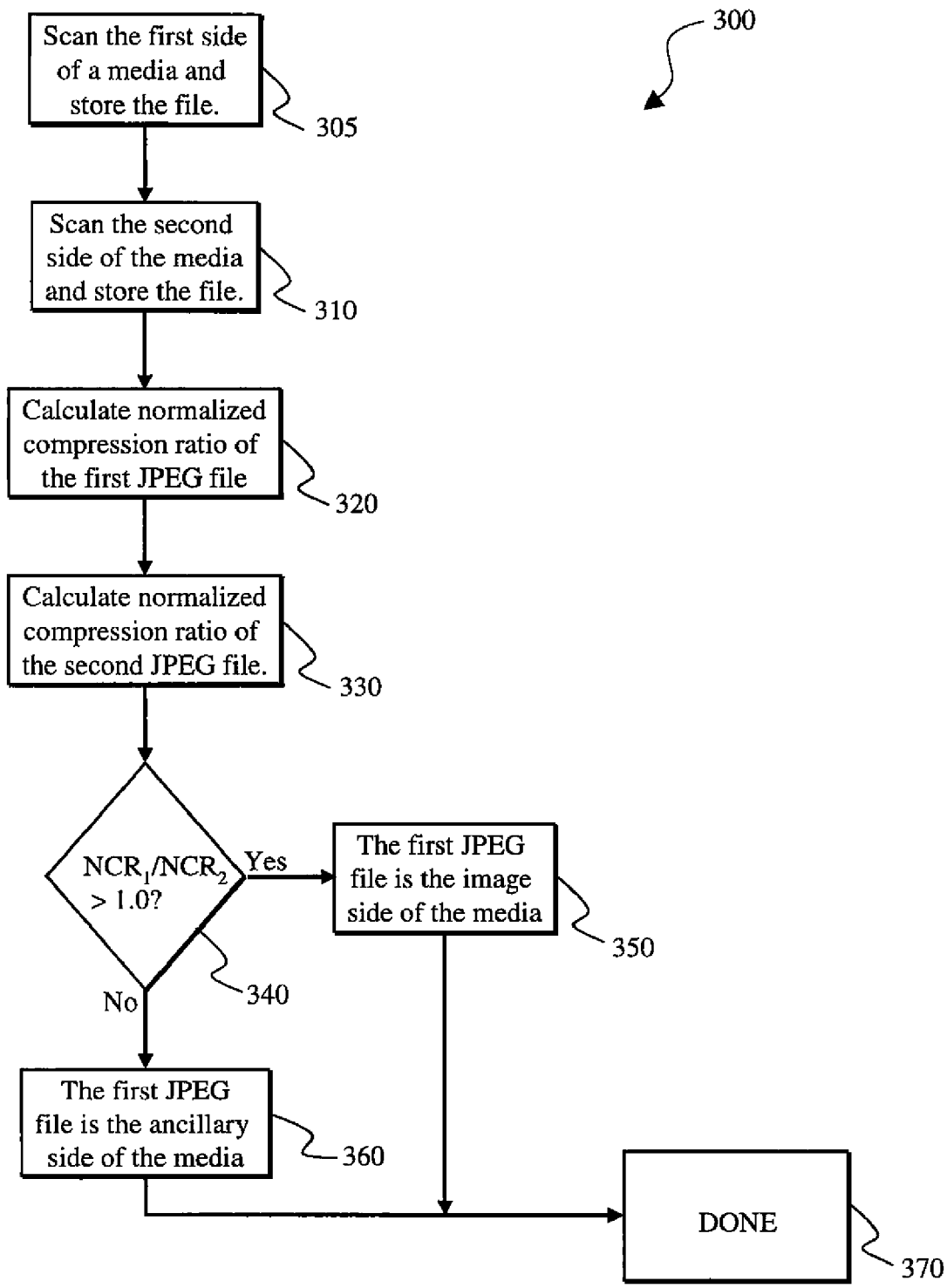
FIG. 3 illustrates a flowchart describing the steps to determine the image side JPEG file and the ancillary image side JPEG file.

FIG. 3 illustrates a flowchart 300 describing the steps to determine the image side JPEG file and the ancillary image side JPEG file. The first side of a hardcopy print or media is scanned and stored as a JPEG file in step 305. The second side of the hardcopy media is also scanned and stored as a JPEG file in step 310. The first and second JPEG files are read from memory and a Normalized Compression Ratio ($NCR_1$) is calculated for the first JPEG file in step 320 and a Normalized Compression Ratio ($NCR_2$) is calculated for the second JPEG file in step 330. The ratio of $NCR_1$ of the first JPEG file to $NCR_2$ of the second JPEG file is calculated in step 340. If the ratio ($NCR_1/NCR_2$) is greater than 1.0, then the first JPEG file is the image side of the scanned hardcopy media in step 350. If the ratio ($NCR_1/NCR_2$) is less than 1.0 then the first JPEG file is the ancillary image side of the scanned hardcopy media in step 360. The process is complete and the two unknown sides have been identified in step 370. At this point the non-image side can be recompressed at higher compression ratio for use in embedding the non-image side into the primary (image) side of the JPEG file.

Figure 4:
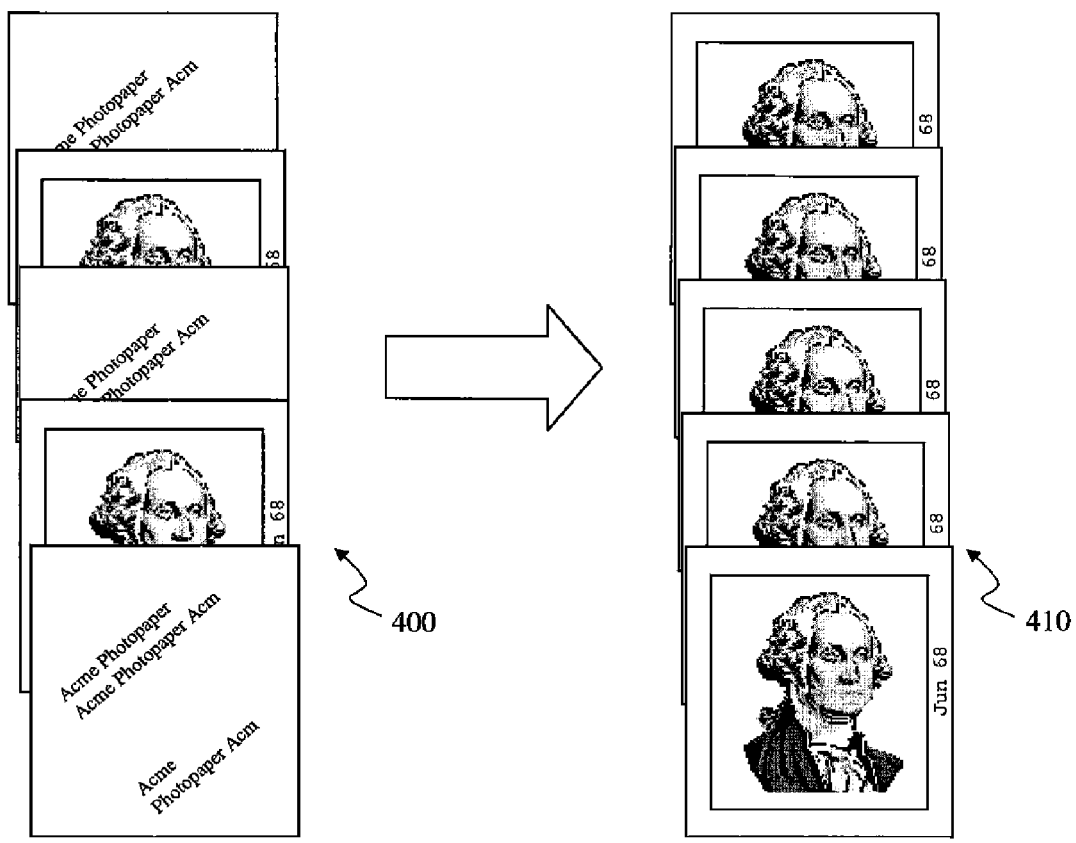
FIG. 4 illustrates automatic organization of a plurality of scanned hardcopy media.

FIG. 4 illustrates automatic organization of a plurality of scanned hardcopy media. In one embodiment, prints can be placed in a scanner in an unorganized stack 400. This relieves the user or operator of having to presort the images. After the operation, all the images are organized in a face up orientation 410 in memory. The result of automatically organizing the stack of images creates a more positive user experience and eliminates the need for rework.

FIG. 5 illustrates an equation for calculating the Normalized Compression Ratio 500 used in sorting the image and ancillary image sides of the scanned hardcopy media. The Normalized Compression Ratio is calculated by first computing the area of the scanned hardcopy media and then dividing the area by size of the JPEG compressed file. More specifically, this is accomplished by multiplying the media height 510 and media width 520 in pixels and dividing the result by the size of the JPEG compressed file 530. It is important that the same compression ratio is used when storing both sides of the scanned hardcopy media.

The invention is not limited to the calculation of the Normalized Compression Ratio as different techniques can be used. For example, a histogram of the image content for each side of the scanned hardcopy media can be compared against a known pattern. By comparing the histograms against a database of known ancillary image sides, the sides can be differentiated and identified as either the image side or the ancillary image side of the hardcopy media.

In another embodiment, a technique involves comparing color channels from the two image sides and comparing color content of the image side with the ancillary image side. The ancillary image side is typically characterized by having a white or neutral background with very little extraneous markings.

In another embodiment, a technique involves measuring a reflectance of the surfaces from the scans of the hardcopy media. The reflectance of the ancillary image side is less than the image side and can be used to discriminate the image side from the ancillary image side.

In yet another embodiment, a technique involves the detection of steganographic marks on either the image side or the ancillary image side of the scanned hardcopy media. Professional printers identify security marks that are used in the detection of illegal copying. These security marks can also be used to detect the image side from the ancillary image side. Eastman Kodak Company also uses hidden marks on the ancillary image side of the paper of their ink jet photographic to designate the quality level of the paper. This technique can also be used to determine the image side from the ancillary image side of the scanned hardcopy media.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

PARTS LIST

100 System
102 Hardcopy print
110 Image side of scanned print
120 Ancillary Image side of scanned print
123 JPEG files
125 Computing device
127 Memory
137 Image side file
147 Ancillary image side file
200 System
210 Image side of print
212 Mount
214 Data
220 Ancillary image side of print
230 Scanner
235 First JPEG file
237 Image side file
240 First storage
245 Second JPEG file
247 Ancillary image side file
250 Second storage
260 Computer
270 Single JPEG files 280 Communication network
290 Indexing server
295 Advertising server
300 Flowchart
305 Scan first side of media
310 Scan second side of media
320 Normalized Compression Ratio ($NCR_1$) of Scanned first side of media
330 Normalized Compression Ratio ($NCR_2$) of Scanned second side of media
340 Test to see if $NCR_1/NCR_2>1.0$?
350 If test is true, record scanned first side of media as the front side of the media
360 If test is false, record scanned second side of media as the front side of the media
370 Algorithm completed
400 Unorganized stack of hardcopy media to be scanned
410 Organized stack of hardcopy media after scanning and processing
500 Normalized compression ratio calculation
510 Media height
520 Media width
530 JPEG compressed file size

What is claimed is:

1. A method for determining a primary side of a double-sided hardcopy media, comprising:
scanning a first side of a hardcopy media to produce a first file;
scanning a second side of the hardcopy media to produce a second file; and
analyzing the first and second files of the scanned hardcopy media for determining the side of primary interest, including comparing the image content of the first side to the image content of the second side by comparing a normalized compression ratio of the first file with a normalized compression ratio of the second file.

2. The method of claim 1, wherein comparing the image content further comprises comparing color of the first file with color of the second file.

3. The method of claim 1, further comprising generating an image/non-image indicator from the analyzed digital files by:
calculating a normalized compression ratio of the first image file;
calculating a normalized compression ratio of the second image file;
indicating the first side as the image side file when the normalized compression ratio of the first image file is less than the normalized compression ratio of the second image file; and
indicating the first side as the non-image side file when the normalized compression ratio of the first image file is greater than the normalized compression ratio of the second image file.

4. The method of claim 3 further comprising storing the indicator in the EXIF header of the image side file.

5. The method of claim 3 further comprising storing the ancillary image side file in the EXIF header of the image side.

6. A system for determining a primary side of a double-sided hardcopy media, comprising:
a scanner for digitizing a first side of a hardcopy media to produce a first file and digitizing a second side of the hardcopy media to produce a second file; and
a processor for analyzing the first and second files of the scanned hardcopy media for determining the side of primary interest, wherein the processor compares normalized compression ratio of the first file with a normalized compression ratio of the second file.

7. The system of claim 6, wherein processor compares the image content of the first side to the image content of the second side.

8. The system of claim 6, wherein the processor compares the color of the first file with color of the second file.

9. The system of claim 6, wherein the processor compares the hardcopy media characteristics of the first side to hardcopy media characteristics of the second side.

10. The system of claim 9, wherein the hardcopy media characteristics include a surface reflectance of the first side of the hardcopy media and a surface reflectance of the second side of the hardcopy media.

11. A method for determining a primary side of a double-sided hardcopy media, comprising:
scanning a first side of a hardcopy media to produce a first file;
scanning a second side of the hardcopy media to produce a second file; and
analyzing the first and second files of the scanned hardcopy media for determining the side of primary interest, including comparing the image content of the first side to the image content of the second side by comparing a histogram of the first file with a histogram of the second file.

12. A method for determining a primary side of a double-sided hardcopy media, comprising:
scanning a first side of a hardcopy media to produce a first file;
scanning a second side of the hardcopy media to produce a second file; and
analyzing the first and second files of the scanned hardcopy media for determining the side of primary interest by comparing hardcopy media characteristics of the first side to hardcopy media characteristics of the second side including comparing the characteristics of one or more layers of the first side of the hardcopy media with characteristics of one or more layers of the second side of the hardcopy media.

13. The method of claim 12, wherein analyzing the first and second files further comprises detecting steganographic marks.

14. The method of claim 13, wherein detecting steganographic marks further comprises detecting photo-finisher marks on the first or second side of the hardcopy media.

15. The method of claim 13, wherein detecting steganographic marks further comprises detecting consumer marks on the first or second side of the hardcopy media.

16. The method of claim 13, wherein detecting steganographic marks further comprises detecting manufacturer marks on the first or second side of the hardcopy media.

17. The method of claim 12, wherein scanning the first and sides of a hardcopy media further comprises scanning the first and second sides of a hardcopy media substantially simultaneously.

* * * * *